(12) United States Patent
Meeker

(10) Patent No.: US 9,293,952 B2
(45) Date of Patent: Mar. 22, 2016

(54) WOUND FIELD FLUX SWITCHING MACHINE WITH SINUSOIDAL BACK ELECTROMOTIVE FORCE

(71) Applicant: QinetiQ North America, Inc., McLean, VA (US)

(72) Inventor: David C. Meeker, Natick, MA (US)

(73) Assignee: Foster-Miller, Inc., Waltham, MA (US)

( * ) Notice: Subject to any disclaimer, the term of this patent is extended or adjusted under 35 U.S.C. 154(b) by 132 days.

(21) Appl. No.: 13/849,760

(22) Filed: Mar. 25, 2013

(65) Prior Publication Data

US 2014/0125156 A1 May 8, 2014

Related U.S. Application Data

(60) Provisional application No. 61/722,282, filed on Nov. 5, 2012.

(51) Int. Cl.
*H02K 19/20* (2006.01)
*H02K 1/16* (2006.01)
*H02K 19/24* (2006.01)
*H02K 19/10* (2006.01)

(52) U.S. Cl.
CPC .............. *H02K 1/165* (2013.01); *H02K 19/103* (2013.01); *H02K 19/20* (2013.01); *H02K 19/24* (2013.01); *H02K 2201/06* (2013.01)

(58) Field of Classification Search
CPC ................................ H02K 1/165; H02K 19/20
USPC .......... 310/165, 166, 168, 180, 184–187, 198
See application file for complete search history.

(56) References Cited

U.S. PATENT DOCUMENTS

| 4,348,605 | A |   | 9/1982  | Török |
|-----------|---|---|---------|---------------------|
| 5,866,964 | A | * | 2/1999  | Li ............... 310/198 |
| 6,075,302 | A |   | 6/2000  | McCleer |
| 6,150,791 | A | * | 11/2000 | Fulton ............ 318/701 |
| 6,204,587 | B1| * | 3/2001  | Torok et al. ...... 310/181 |
| 6,242,834 | B1|   | 6/2001  | Akemakou |
| 7,218,019 | B2|   | 5/2007  | Potter |
| 8,004,127 | B2|   | 8/2011  | Potter |

OTHER PUBLICATIONS

Arkkio, A. et al., "Induction and Permanent-Magnet Synchronous Machines for High Speed Applications", Proceedings of the Eighth International Conference on Electrical Machines and Systems, Sep. 29, 2005, pp. 871-876.
Cao, R. et al., "A Linear Doubly Salient Permanent-Magnet Motor With Modular and Complementary Structure", IEEE Transactions on Magnetics, vol. 47, No. 12, pp. 4809-4821, Dec. 2011.
Liang, F., et al., "A New Variable Reluctance Motor Utilizing an Auxiliary Commutation Winding", IEEE Transactions on Industry Applications, vol. 30 No. 2, pp. 423-432, Mar./Apr. 1994.

* cited by examiner

*Primary Examiner* — Dang Le
(74) *Attorney, Agent, or Firm* — Landiorio Teska & Coleman, LLP

(57) ABSTRACT

A wound field flux switching machine with a sinusoidal back electromotive force features a rotor with teeth and a stator with groups of teeth wherein each group has a field winding and each tooth has a phase winding.

17 Claims, 4 Drawing Sheets

WOUND FIELD FLUX SWITCHING MACHINE WITH SINUSOIDAL BACK ELECTROMOTIVE FORCE

RELATED APPLICATIONS

This application claims benefit of and priority to U.S. Provisional Application Ser. No. 61/722,282 filed Nov. 5, 2012 under 35 U.S.C. §§119, 120, 363, 365, and 37 C.F.R. §1.55 and §1.78 incorporated herein by this reference.

FIELD OF THE INVENTION

This invention relates to motors and generators.

BACKGROUND OF THE INVENTION

A present method of generating power on aircraft is through an Auxiliary Power Unit (APU). APUs are used on airliners to provide electricity when the main engines are off (e.g. to run the air conditioning while passengers are boarding). These systems consist of a small gas turbine engine connected to a wound-field synchronous generator. This class of generator is desirable because the output voltage of the generator can be regulated by servoing the current in the field winding. So that the generator does not have endure high rotational stress, the generator is typically coupled to the engine through a speed-reducing gear box.

However, the power level of most APUs is low compared to that required to operate Directed Energy Weapons (DEWs). To reduce generator weight for DEW applications, it is desirable to directly couple the generator to the gas turbine, since power density of an electric machine goes up roughly linearly with rotational speed. Wound field machines have a complicated rotor structure. Most machines have a windings and a rectifier bridge located on the rotor, and a separate exciter rotor section is needed to induce the DC field winding current on the rotor. It is difficult to make a wound-field rotor with the mechanical integrity required to run at high speeds.

Consequently, most high-speed generators disclosed in the literature are of one of three types: Surface-mount permanent magnet motor (PM), Induction motor (IM), and Switched reluctance motor (SRM). See, A. Arkkio et al., "Induction and Permanent-Magnet Synchronous Machines for High Speed Applications," Proceedings of the Eighth International Conference on Electrical Machines and Systems, 29-29 Sep. 2005, incorporated herein by this reference.

The disclosed machine is in the general class of Doubly Salient or Flux Switching machines. Flux switching machines that are superficially similar to the presently disclosed machine are described in the literature. See, F. Liang, Y. Liao, and T. Lipo, "A new variable reluctance motor utilizing an auxiliary commutation Winding", IEEE Transactions on Industrial Applications, 30(2):423-432, March/April 1994. http://lipo.ece.wise.edu/1992pubs/92-25T.pdf incorporated herein by this reference. See also, R. Cao et al.: A Linear Doubly Salient Permanent-Magnet Motor With Modular and Complementary Structure", IEEE Transactions on Magnetics, 47(12):4809-4821, December 2011, incorporated herein by this reference. However, the presently disclosed machine has novel design differences that reduce cogging torque and produce better conditioned output voltage.

SUMMARY OF THE INVENTION

Featured is a wound field flux switching machine (motor or generator) with a net flux linkage for each phase that is symmetric about zero and close to sinusoidal in shape resulting in a sinusoidal back electromotive force (BEMF) and an output voltage that can be easily regulated.

Featured is a machine comprising a rotor with teeth and a stator with groups of teeth, wherein each group has a field winding and each stator tooth has a phase winding. The result is a wound field flux switching machine with a sinusoidal back electromotive forces. In some embodiments, the rotor and stator teeth in adjacent groups are configured to be out of phase.

In one design, the rotor and stator have an even number of teeth, the stator having more teeth than the rotor. For example, one rotor has ten teeth and a stator has twelve teeth. Here, each stator group has three teeth with four said groups. Preferably, the rotor teeth are wider that the stator teeth. Also featured is a machine in which the spacing between each stator group of teeth is equal and greater than the equal spacing between adjacent stator teeth in a group. Preferably, the rotor teeth are skewed.

Also featured is a machine comprising a rotor with an even number of teeth, a stator with an even number of teeth arranged in groups, each group having a field winding, each tooth having a phase winding, and the stator having more teeth than the rotor.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
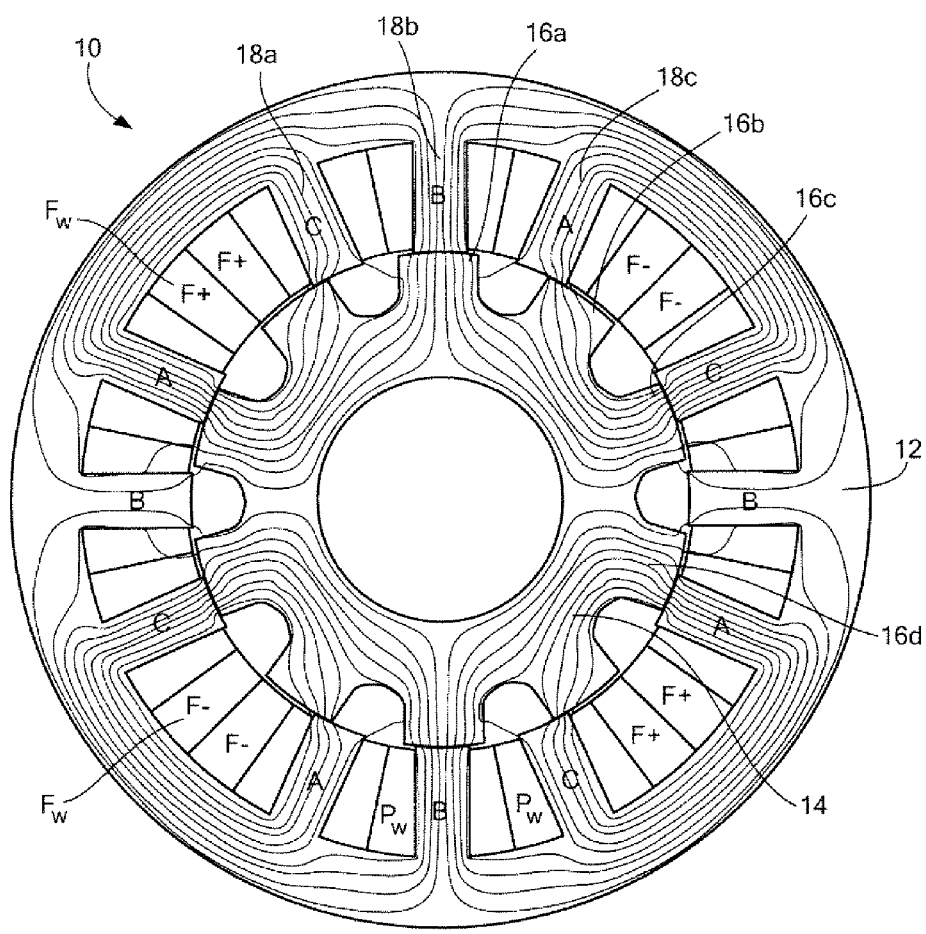
FIG. 1 is a cross sectional view of a wound field flux switching machine with sinusoidal BEMF.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

This disclosure concerns, in one example, a wound field flux switching electric machine. In one design, see FIGS. 1 and 2, the machine employs a 10-toothed rotor built out of laminated iron. There are typically no windings on the rotor. The machine may have a 12-toothed stator. The stator teeth are segregated in four quadrants. Each quadrant has three teeth, each wrapped with a coil from a single phase. All three teeth in a quadrant are wrapped by a stationary field winding.

A coil from a single phase is wound around each tooth and a stationary field coil encircles every three stator teeth. This machine gives the advantages of a wound-field generator (i.e., easy-to-regulate output voltage, simple power conditioning electronics, sinusoidal output voltage) with that of a Switched Reluctance machine (simple, robust construction, concentrated stator windings, no brushes or exciter required). The machine may be appropriate for high-speed generating applications such as a direct-drive alternator attached to a gas turbine engine. The machine also may be appropriate as a motor for electric vehicle applications where field weakening is needed at high speeds and simple machines without rare earth magnets are needed to obtain low cost.

Unlike typical SRMs, the rotor teeth are wider than the stator teeth. The rotor tooth and slot pitch are even, and the rotor tooth with is 3/2 the stator tooth width (i.e. 36 degree tooth pitch and 18 degree tooth width). The rotor teeth are skewed over ⅓ of the width of the tooth over the length of the rotor (i.e. 6 degree skew).

The three stator phases may be connected together in a Wye winding configuration. The rotor teeth are fatter than the stator teeth, the rotor is skewed, and the teeth in top and bottom quadrants are out of phase with the left and right quadrants. This combination results in a net flux linkage for each phase that is symmetric about zero and close to sinusoidal in shape. Consequently, the back-EMF waveform of the line-to-line voltage is nearly sinusoidal as well.

10 rotor teeth, 12 stator teeth grouped into "quadrants" with 24 degree tooth pitch, and a skewed rotor allow the machine to retain the advantages of the SRM: a simple laminated rotor structure and concentrated winding for simplicity and good heat flow.

The invention also mitigates shortcomings of the SRM design in that the proposed design does not require complicated drive electronics to act as a generator. The sinusoidal BEMF and output voltage that can be easily regulated via the field winding allow a simple/light rectifier bridge to be used as the associated generator power electronics. Torque ripple is not high. Choice of relative tooth widths and rotor tooth skew reduces torque ripple versus SRM/Doubly Salient machines. The power density of the machine is about the same as a SRM machine.

FIGS. 1-4 show machine 10 (e.g., a generator or motor) with stator 12 and rotor 14. Rotor 14, in this example, has ten equal size and equally spaced teeth 16 resulting in a symmetrical (balanced) rotor. Stator 12 has three teeth 18a, 18b, 18c in each group defining phases A, B, and C as shown and four such groups of three teeth or 12 teeth total. In a group, the stator teeth are equal in size and spaced equally. Between groups, the spacing is greater. Each stator tooth has a phase winding $P_w$ and each group of three stator teeth has a field winding $F_w$ better depicted in FIGS. 3-4.

Thus, the rotor teeth and the stator teeth and adjacent groups are configured to be out of phase (e.g., the rotor teeth at the top and bottom of the rotor as shown in FIG. 1 are aligned with the B phase while the rotor teeth on the right and left sides are not).

Figure 2:
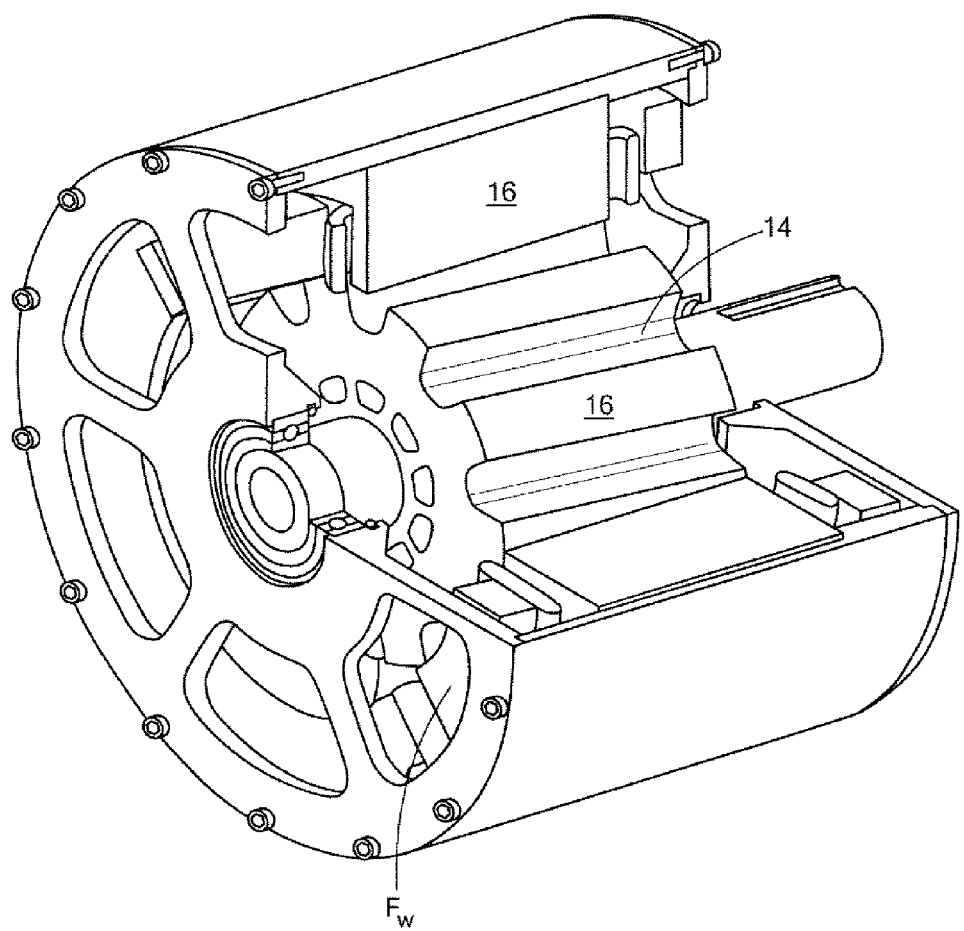
FIG. 2 is three dimensional partially cutaway view of the machine shown in FIG. 1.
Figure 3:
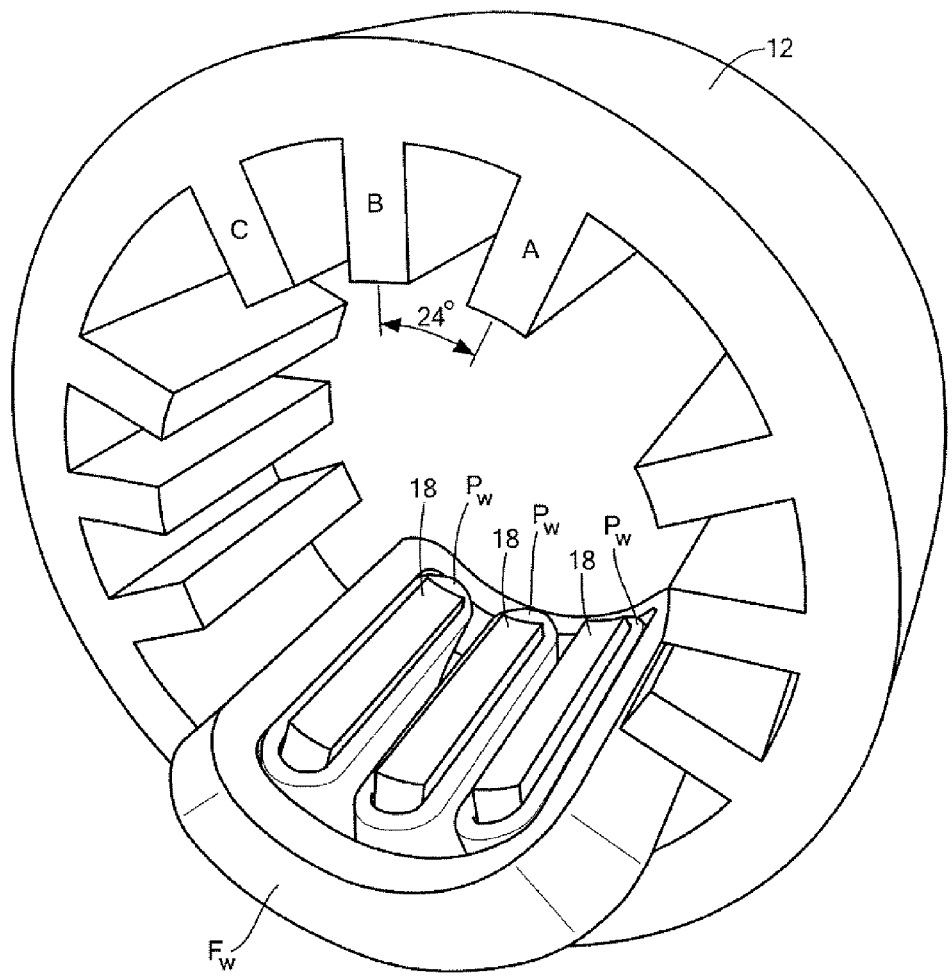
FIG. 3 is a three dimensional schematic view of a stator in accordance with an example of the invention.
Figure 4:
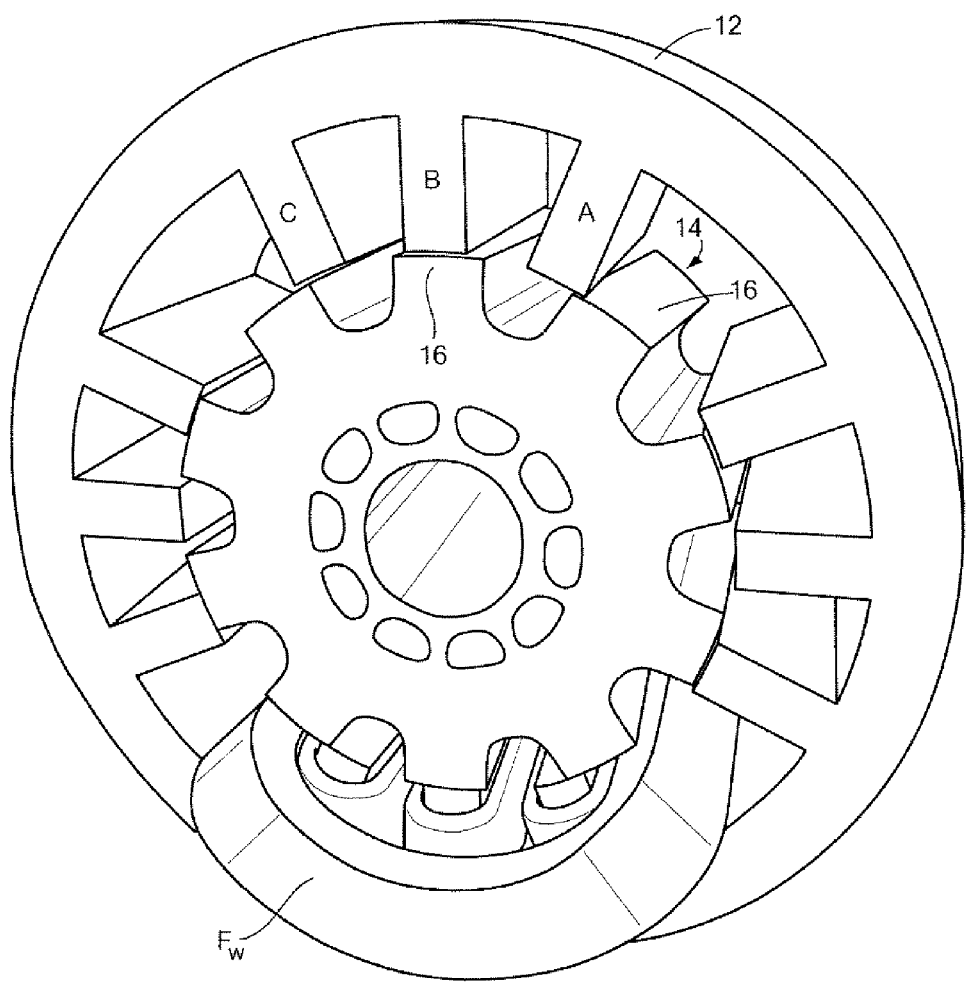
FIG. 4 is a schematic three dimensional front view showing the stator of FIG. 3 as well as a rotor in accordance with an example of the invention.

FIG. 2 shows how rotor teeth 16 are preferably skewed. The result is a wound field flux switching machine with a sinusoidal back electromotive four which is easily regulated.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A machine comprising:
a rotor with teeth;
a stator with groups of teeth, each group having a field winding, each tooth having a phase winding; and
rotor and stator teeth in adjacent groups configured to be out of phase, the rotor and stator teeth configured such that opposite teeth on the rotor are aligned with one another and aligned with the teeth of opposite stator teeth field winding groups and in an adjacent stator teeth field winding group no rotor tooth is aligned with said stator phase.

2. The machine of claim 1 in which the rotor and stator have an even number of teeth, the stator having more teeth than the rotor.

3. The machine of claim 2 in which the rotor has ten teeth and the stator has twelve teeth.

4. The machine of claim 2 in which each stator group has three teeth with four said groups.

5. The machine of claim 1 in which the rotor teeth are wider that the stator teeth.

6. The machine of claim 1 in which the equal spacing between adjacent suitor teeth in a group is equal and the spacing between adjacent groups is equal but greater than the spacing between stator teeth in a group.

7. The machine of claim 1 in which the rotor teeth are skewed.

8. A machine comprising:
a rotor with ten teeth;
a stator with twelve teeth having a 24° pitch arranged in groups, each group having a field winding, and each tooth having a phase winding;
the rotor and stator teeth configured such that in a stator teeth field winding group a rotor tooth is aligned with a stator phase and an adjacent stator teeth field winding group no rotor tooth is aligned with said stator phase; and
the pitch between stator teeth in adjacent groups being larger than 24°.

9. The machine of claim 8 in which each stator group has three teeth with four said groups.

10. The machine of claim 8 in which the rotor teeth are wider than the stator teeth.

11. The machine of claim 8 in which the rotor teeth are skewed.

12. A machine comprising:
a rotor with teeth;
a stator with groups of teeth, each group having a field winding, each tooth having a phase winding;

the spacing between each group of stator teeth being equal and being greater than an equal spacing between adjacent stator teeth in a group; and the rotor teeth configured for an out of phase relationship between rotor and stator teeth in adjacent groups, the rotor and stator teeth configured such that in a stator teeth field winding group a rotor tooth is aligned with stator phase and in an adjacent stator teeth field winding group no portion of a rotor tooth is aligned with said stator phase.

13. The machine of claim 12 in which the rotor and stator have an even number of teeth, the stator having more teeth than the rotor.

14. The machine of claim 13 in which the rotor has ten teeth and the stator has twelve teeth.

15. The machine of claim 12 in which each stator group has three teeth with four said groups.

16. The machine of claim 12 in which the rotor teeth are wider that the stator teeth.

17. The machine of claim 12 in which the rotor teeth are skewed.

* * * * *